April 18, 1944. H. HOLLIS Re. 22,471
SIDE DISK TERRACING MACHINE
Original Filed July 16, 1941 3 Sheets-Sheet 1
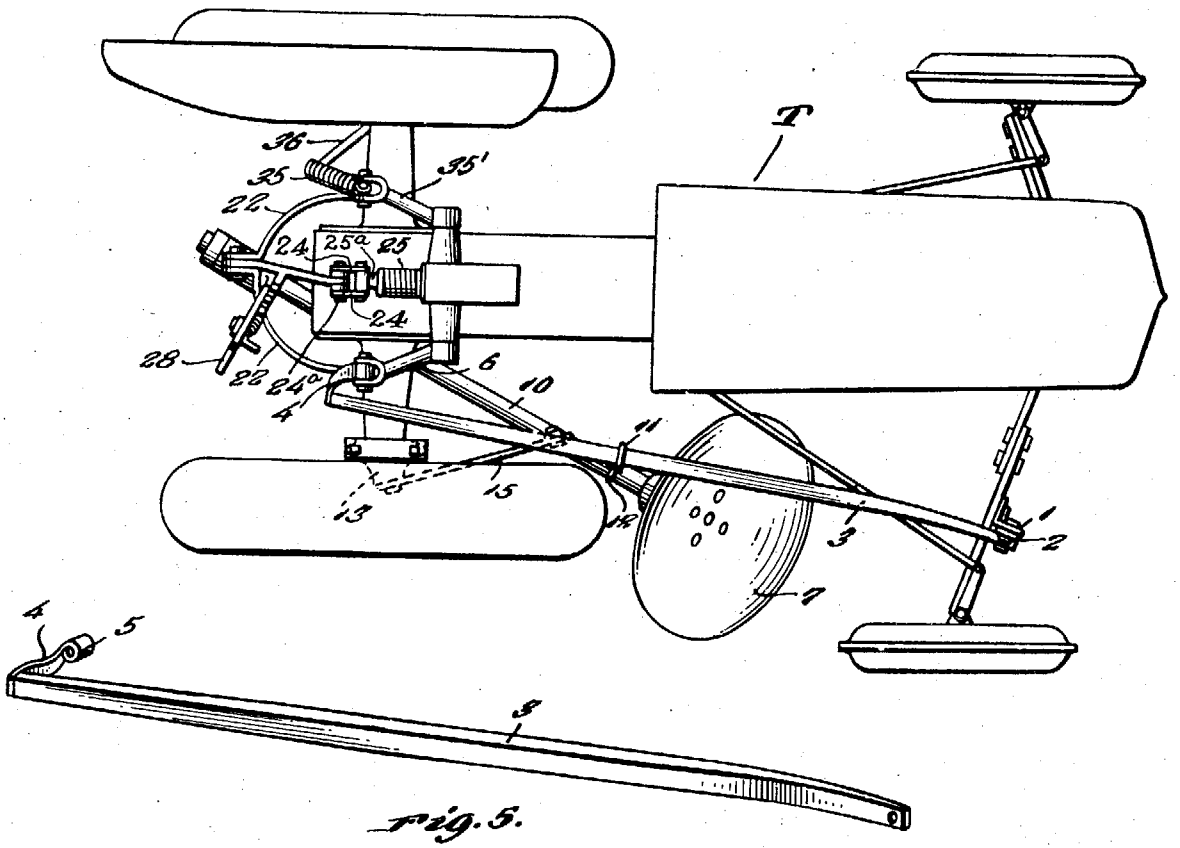
INVENTOR.
Homer Hollis
BY
Parker, Carlson, Pitzner & Hubbard.
Attorneys.

April 18, 1944. H. HOLLIS Re. 22,471
SIDE DISK TERRACING MACHINE
Original Filed July 16, 1941 3 Sheets-Sheet 2
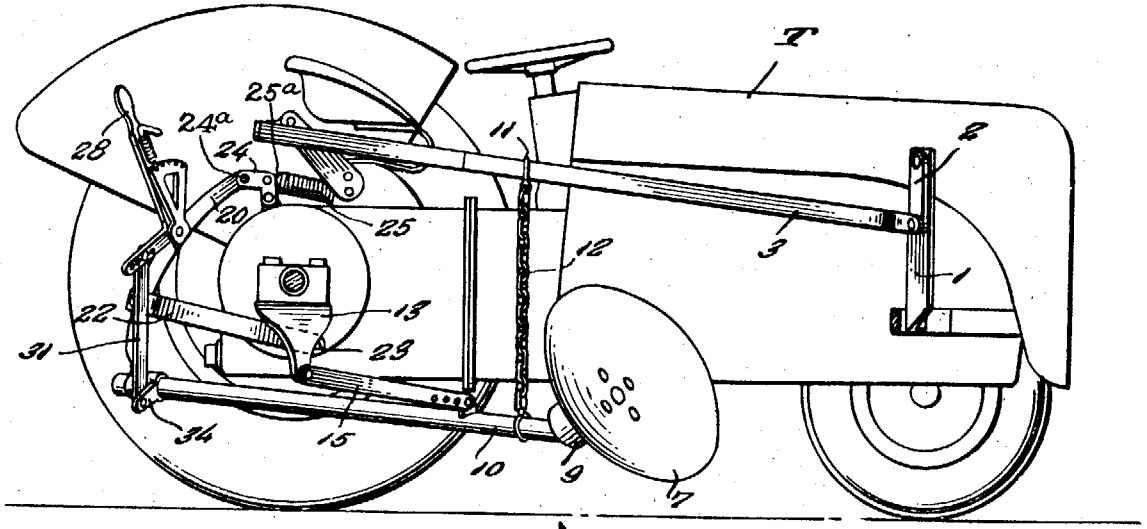
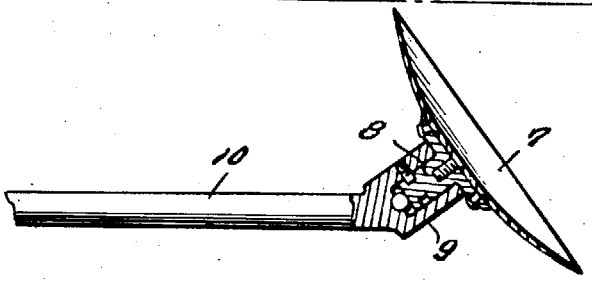
INVENTOR.
Homer Hollis
BY
Parker, Carter, Pidgeon & Hutchison
Attorneys April 18, 1944. H. HOLLIS Re. 22,471

SIDE DISK TERRACING MACHINE

Original Filed July 16, 1941 3 Sheets-Sheet 3

INVENTOR.

Homer Hollis

BY

Parker, Carlson, Pitzner & Hubbard

Attorneys.

Reissued Apr. 18, 1944

Re. 22,471

UNITED STATES PATENT OFFICE 22,471

SIDE DISK TERRACING MACHINE

Homer Hollis, Lillie, La., assignor to G. A. Kelly Plow Company, Longview, Tex., a corporation of Texas Original No. 2,295,898, dated September 15, 1942, Serial No. 402,673, July 16, 1941. Application for reissue September 13, 1943, Serial No. 502,171

15 Claims. (Cl. 97—47)

This invention relates to a terracing machine, the general object of the invention being to provide a disk plow so supported that it operates between the front and rear wheels of a tractor or four wheel vehicle, with means for adjusting the parts to different positions.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings, wherein like characters denote like or corresponding parts throughout the several views, and in which:

Figure 1 is a top plan view of a tractor showing the invention in use thereon.

Fig. 2 is a side elevational view of Fig. 1 with parts of the tractor omitted.

Fig. 3 is a diagrammatic view of parts of the invention removed from the tractor.

Fig. 4 is a fragmentary sectional view showing how the disk is connected to its supporting shaft.

Figure 6:
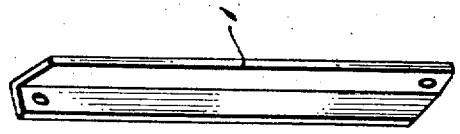
Fig. 6 is a view of the upright to which the front end of the beam is connected.
Figure 5:
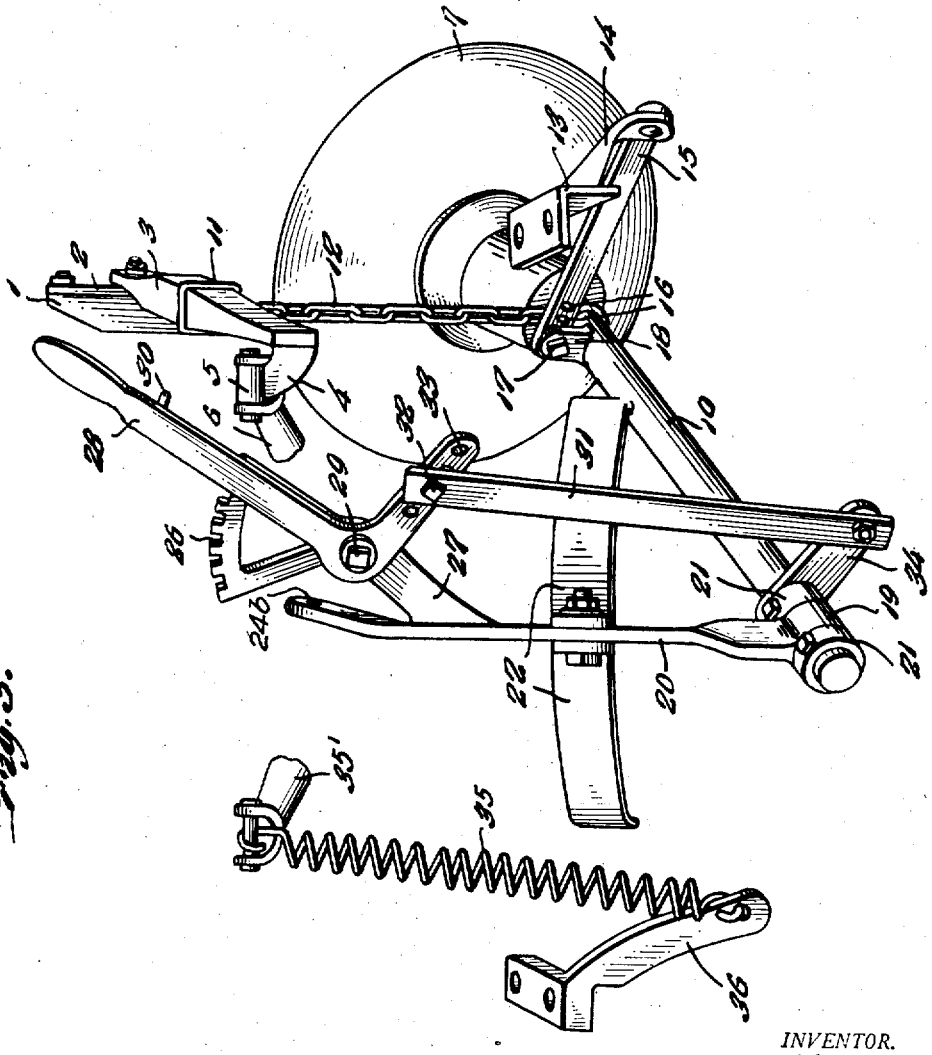
Fig. 5 is a view of the supporting beam.

In these views the letter T indicates a tractor which, in the present instance, has been shown as being equipped with a hydraulic type power operated lift mechanism of well-known commercial form and also disclosed specifically in Henry G. Ferguson Patent No. 2,118,180, issued May 24, 1938. This hydraulic lift mechanism comprises vertically swinging crank arms 6 and 35′ on the upper rear portion of the tractor and which are used in manipulating my novel plow attachment for tractors generally in a manner which will hereinafter appear, this particular tractor having been chosen for illustration simply by way of example of one well-known form which is suitable for the purpose.

In carrying out the invention the plow is desirably supported, in part, from the front portion of the tractor in order that the plow shall rise and fall with the rise and fall of the fore portion of the tractor in passing over the contour of the ground. As to the details of the exemplary mounting, an upright member 1 is fastened to the front axle of the tractor at one side thereof and a link 2 is pivoted at the upper end of this member 1 and the front end of a beam 3 is pivoted to the lower end of the link so that the beam can move forwardly and rearwardly as it is moved up and down by the lifter arm 6, whereby the motion of the beam 3 is accommodated to the fore and aft movement of the arm 6 which is incident to the vertical swinging of the latter. The rear end of the beam is formed with a laterally extending arm 4 which has a sleeve 5 thereon which is connected to the arm 6 forming part of the hydraulic lift means of the tractor or if the tractor does not have this hydraulic lift means then the beam can be raised and lowered by other means. From the lifting beam 3, the plow proper is suspended in the manner next described.

The disk plow is shown at 7 and has its shank 8 rotatably arranged in a socketed part 9 of a shaft or pusher bar 10, the part 9 being arranged at an angle to the longitudinal axis of the shaft as shown more particularly in Fig. 4. A collar 11 encircles a part of the beam 3 and can be adjusted toward and away from the center of the beam and a chain 12 or other flexible member depends from the collar and is connected to the shaft 10 so that this flexible member 12 suspends the front end of the shaft 10 from the beam 3. A bracket 13 is fastened to a side part of the tractor, preferably the rear axle thereof at one end thereof and has an arm 14 thereon to which is pivoted a bar 15 the other end of which is provided with a plurality of holes 16 any one of which is adapted to receive a bolt 17 which passes through an ear 18 on the shaft 10. The bar 15 in its assembled position serves as a tension brace to prevent the plow 7 from being pushed sidewise under the tractor due to the reaction of the dirt on the plow 7. Also because of its special position it increases the backward thrust on shaft 10 to further facilitate the operation of the controls of the hydraulic lift device on the tractor to which the rear end of the shaft 10 is connected, as will appear below.

The rear end of the shaft 10 loosely fits in a ring 19 formed on the lower end of an upstanding member or link 20, collars 21 fastened to the shaft 10 holding the said end of the shaft in position in the ring 19. Arcuate members 22 are fastened to an intermediate part of the member 20 and the front ends of these arcuate members 22 are fastened to rear portions of the tractor as at 23 so that these members 22 can swing upwardly and downwardly. This vertical swinging motion of the bail-like structure or frame 22 accommodates the vertical displacement of the link 20 incident to its transmission of the fore and aft motion of the shaft or pusher bar 10 to the control elements connected to the upper end of the link or member 20. The upper end of the member 20 is connected by a pin 24a passing through hole 24b in such member (see Fig. 3) to a pair of bell cranks 24, which are in turn connected with the spring member 25 supported from a part of the hydraulic means. Details of this hydraulic means are well-known in the art and are set forth, for example, in the Ferguson patent identified above. Suffice it to say here that the spring 25 is the usual compression spring provided in such installations and tends to swing the bell crank 24 outward. Attached to the bell crank is the usual control plunger 25a passing through the spring 25 and controlling, by its axial movement, the admission or exhaust of pressure fluid for the hydraulic mechanism. As is well understood, the arms remain at rest so long as the pressure on the plunger 25a is at a predetermined value fixed by the spring 25, but upon an increase in the pressure on the plunger 25a above such predetermined value, its resultant shift of the plunger causes the arms 6 and 35' to be swung upward, whereas a diminution in pressure on the plunger below such predetermined value causes the arms to lower a corresponding predetermined amount. That being the case, it will thus be seen that the ground reaction on the plow disk 7 is transmitted as thrust through the pusher bar or shaft 10 and reacts on the spring urged plunger 25a, through the link 20, to vary the depth of penetration of the disk 7 automatically, wherefore a substantially constant draft load is maintained.

To facilitate angular or rotational adjustment of the shaft 10 in changing the angle of entry of the plow disk 7 into the ground, a quadrant 26 is attached by a bracket 27 to a part of the member 20 and a hand lever 28 is pivoted to the bracket 27 as at 29 and has a detent 30 cooperating with the teeth of the bracket. A bar 31 has its upper end adjustably connected with the lever 28 by a bolt 32 engaging any one of a row of holes 33 in the lever and the lower end of the bar is pivoted to an arm 34 connected with the inner collar 21 so that by adjusting the lever 28 the shaft can be turned or rocked to adjust the disk 7.

The numeral 35 indicates a spring connecting the arm 35' of the hydraulic means with a bracket 36 attached to a rear part of the tractor. This spring tends to move the hydraulic arms downwardly to cause the plow to engage the soil.

Thus by adjusting the beam 3 by means of the hydraulic means the shaft 10 and the disk can be raised and lowered to govern the plowing depth or to raise the disk entirely clear of the ground when it is desired to transport the apparatus from one position to the other. The disk can also be adjusted through means of the hand lever 28 to provide the right plowing angle for the disk in relation to the tread line of the tractor. The bar 15 will permit free up and down movement of the shaft 10 but holds it in fixed position against any movement to either side. By changing the cutting angle of the disk through means of the lever 28 the furrow or the dirt to be moved by the disk is regulated.

Attention is directed to the fact that since the forward end of the beam 3 is supported at a point close to the right forward wheel, as shown in Fig. 1, the motion of the right forward wheel is carried to the beam 3 substantially unmodified by the motion of the left forward wheel. This feature is of a decided benefit since the forward right wheel is in line with the plow and serves as an advance detector of the contour of the earth to be plowed.

As will be seen pressure of the soil on the plow will tend to move the shaft 10 rearwardly and this movement is resisted by the spring means 25 acting on the upper end of the member 20, the lower end of which carries the rear end of the shaft. The transmission of the thrust on the shaft 10 through the link 20 to the spring urged plunger 25a actuates the latter to raise or lower the plow as required to maintain a substantially constant draft load on the plow.

While Fig. 4 shows one manner of rotatably supporting the plow 7 with the front end of the shaft 10 it is to be understood that any other suitable means can be used for this purpose.

As the tractor moves along with the plow 7 entering the soil the friction of the soil against the plow will cause it to rotate and thus a furrow is formed in front of the rear wheel and the dirt is thrown to one side of the tractor, the parts being adjustable to make the furrow of varying depths and the plow will be caused to follow the contour of the ground as it follows the front right wheel which automatically raises and lowers the plow as the wheel passes over high and low parts of the ground. The angle of the plow can be adjusted by partly rotating the shaft 10 by means of the hand lever 28.

By way of brief resume of operation, it should be observed that during transport of the plow the disk 7 is, as previously noted, raised entirely clear of the ground. For that purpose the beam 3 is elevated by swinging the hydraulically operated arms 6, 35' upward to their full extent through manipulation of the usual manual control (not shown) for the hydraulic lift device. On arrival at the point of use, the arms 6, 35' are swung downward, lowering the beam 3 and the disk 7 into working position. The operator, through use of the lever 28, adjusts the angle of the disk 7 to throw the plowed dirt outward the distance desired. In building a terrace he may conveniently change the disk angle progressively on successive passes, thus greatly facilitating the terracing operation. As the tractor advances, the right front wheel normally runs in the previously plowed furrow and, by virtue of the mounting of the beam 3 with its forward end positioned to rise and fall with such front wheel, the plow is raised and lowered by the beam as required to follow the contour of the ground. Such contour following motion of the lift beam 3 is, in effect, modified by the raising or lowering of the arm 6 occasioned by the action of the thrust load on the shaft 10, and which is transmitted to the controls through the link 20. In other words, this transmission of the thrust load, occasioned by the ground reaction on the plow disk 7, is transmitted to the control of the hydraulic lifter device and serves to maintain the depth of penetration for the plow such that a substantially uniform draft load is retained despite changes in character of the soil being plowed, etc.

It is thought from the foregoing description that the advantages and novel features of the invention will be readily apparent.

It is to be understood that changes may be made in the construction and in the combination and arrangement of the several parts provided that such changes fall within the scope of the appended claims.

I claim as my invention:

1. In a four wheel vehicle, an upright extending from the front axle thereof at one side thereof, a beam having its front end pivotally and swingably connected with the top end of the upright, a shaft, a disk connected for rotary movement with the front end of the shaft, a member depending from the beam and connected with the front part of the shaft, means for rotatably supporting the rear end of the shaft, said shaft extending forwardly and outwardly with the disk located substantially between the front and rear wheels at one side of the vehicle and means for raising and lowering the beam.

2. In combination with a four wheel vehicle, an upright connected to the front axle thereof adjacent one side thereof, a link pivoted at its upper end to the other end of the upright, a beam having its front end pivotally connected with the lower end of the link, means for raising and lowering the rear end of the beam, a flexible member depending from the beam intermediate the ends thereof, a shaft having its front portion connected with the lower end of the flexible member, a disk rotatably connected with the front end of the shaft and arranged at an inclination to the shaft, means for rotatably supporting the rear end of the shaft with the shaft extending forwardly and outwardly with the disk arranged substantially between the front and rear wheels at one side of the vehicle and means for rocking the shaft.

3. In combination with a tractor having hydraulic lift means, an upright connected with the front axle of the tractor at one side thereof, a beam having its front end pivotally and swingably connected with the upper end of the upright, means for connecting the rear of the beam with the hydraulic means, a flexible member adjustably connected with an intermediate part of the beam, a disk carrying shaft having its front end connected with the lower end of the flexible member, the disk having its hub arranged at an inclination to the length of the shaft, means for holding the shaft against sidewise movement, means for rotatably supporting the rear end of the shaft, a hand lever connected with the tractor, and means actuated thereby for rocking the shaft to adjust the inclination of the disk.

4. In a cultivating vehicle having a forward and a rear axle, a lifting beam, movably connected to the forward axle and movably connected to the body of the cultivating vehicle, a shaft, a disk rotatably connected to the shaft, a lifting member connected to the shaft and the lifting beam, means for rotatably supporting the shaft, said shaft extending in a forwardly direction with the disk located substantially between the front and rear axles of the cultivating vehicle and means for raising and lowering the beam.

5. In a cultivating device for attachment to a tractor having a lifting device thereon, the combination of a lifting beam, means for movably connecting said beam to a forward portion of the tractor, a shaft, a disk rotatably connected to the shaft, a lifting member connected to the shaft and the lifting beam, means for rotatably supporting the shaft on the tractor with the shaft extending in a forwardly direction and with the disk thereon located substantially between the front and rear wheels of the tractor, and means for connecting said lifting beam to the lifting device on the tractor.

6. In a terracing plow attachment for a tractor having a power actuated lift means on its upper rear portion, the combination of a lifting beam, means for pivotally supporting the front end of the beam on the front portion of the tractor to rise and fall with the same and with the beam extending generally rearwardly alongside the body of the tractor, means for detachably connecting the rear end portion of said beam to the lift means on said tractor to utilize the lift means for swinging the beam vertically about its front end pivotal connection, a pusher bar having means on one end portion thereof for connecting the same to the rear portion of the tractor with the bar projecting generally forwardly in position to be thrust forward by the tractor as the latter advances, a plow disk revolubly mounted on the front of said pusher bar, and means for suspending the forward portion of said pusher bar from said beam to move in a vertical direction with the latter.

7. In an implement attachment for a tractor having a power actuated pivoted arm on its upper rear portion swingable in a fore and aft direction as an incident to raising and lowering the same, the combination of a lifting beam adapted to extend generally horizontally alongside the body of the tractor, means for connecting the rear portion of the beam to the arm on the tractor for raising and lowering thereby, means including a generally vertically extending member pivotally connected at one end thereof to the forward end of the beam and adapted to be pivotally connected at its other end to the fore portion of the tractor for supporting the front end of the beam to rise and fall with the front end of the tractor while accommodating fore and aft motion of the beam incident to vertical movement of the beam by the arm on the tractor, a ground engaging implement, and means for supporting such implement, at least in part, by said beam.

8. In an implement attachment for a tractor having a power actuated pivoted arm on its upper rear portion swingable in a fore and aft direction as an incident to raising and lowering the same, the combination of a lifting beam adapted to extend generally horizontally alongside the body of the tractor, means for connecting the rear portion of the beam to the arm on the tractor for raising and lowering thereby, means including a generally vertically extending member pivotally connected at one end thereof to the forward end of the beam and adapted to be pivotally connected at its other end to the fore portion of the tractor for supporting the front end of the beam to rise and fall with the front end of the tractor while accommodating fore and aft motion of the beam incident to vertical movement of the beam by the arm on the tractor, a pusher bar having means on one end portion thereof for connecting the same to the rear portion of the tractor with the bar projecting generally forwardly in position to be thrust forward by the tractor as the latter advances, a plow disk revolubly mounted on the front of said pusher bar, and means for suspending the forward portion of said pusher bar from said lifting beam.

9. In a cultivating attachment of the general type set forth, the combination of lifting beam and a pusher bar adapted to be disposed one above the other in the order named alongside a tractor, a flexible line suspending the fore portion of the pusher bar from an intermediate portion of the lifting beam, a disk mounted on the forward end of the pusher bar, means for anchoring the rear end of the pusher bar on the rear portion of a tractor, and means for connecting the front and rear portions of the beam respectively to the front portion and body of a tractor with the beam extending generally horizontally.

10. In a disk type plow, the combination of a pusher bar having means on the rear portion thereof for connecting it to a vehicle with the bar extending forwardly and slightly laterally of the path of advance of the vehicle, a plow disk, means for revolubly supporting said disk on the fore portion of the pusher bar with the axis of revolution of the disk slightly angled with respect to the longitudinal axis of the bar and with said axes substantially intersecting each other, and means for rotatively adjusting said bar about its longitudinal axis to vary the angle of entry of the disk into the ground.

11. In an implement of the type set forth, the combination with a revoluble plow disk, of a support therefor rotatively adjustable about an axis slightly inclined with respect to the axis of revolution of the disk and disposed with said axis of adjustment substantially intersecting said axis of revolution.

12. In a disk plow attachment for a tractor having a yieldable spring device thereon, the combination of a pusher bar having a plow disk on its fore portion, means for supporting said pusher bar from the tractor in position to project generally forwardly beneath the tractor, and means including a link connecting the rear portion of said pusher bar to the spring device on the tractor to effect a yielding resistance by the spring device to endwise motion of the pusher bar under the influence of ground reaction on said plow disk.

13. In a disk plow attachment for a tractor, the combination of a pusher bar having a plow disk on its fore portion and adapted to extend generally forwardly in the direction of advance of the tractor, an upstanding link connected at its lower end to the rear portion of the bar and adapted to be connected at its upper end to a movable element of a hydraulic device on the tractor, and a supporting device connected to the intermediate portion of said link and adapted to be secured to the rear of the tractor.

14. In a disk plow attachment for a tractor, the combination of a generally horizontal frame having a pair of arms shaped to embrace a rear portion of the tractor and having means on such arms for pivotally connecting the frame to the tractor for generally vertical movement, an upstanding link pivoted intermediate its ends to an intermediate portion of said frame and being adapted for connection of its upper end to a movable element of a hydraulic device on the tractor, a pusher bar having a plow disk on its fore portion, and means for connecting the rear end portion of the bar to the lower end of said link and with the bar extending forwardly and laterally beneath the frame.

15. In a disk plow attachment for a tractor having a power actuated lift device thereon with a movable control part, the combination with a pusher bar adapted to be supported at least in part from the lift device and having a plow disk on its fore portion, of means for transmitting thrust from the pusher bar to the control part of the tractor.

HOMER HOLLIS.